United States Patent [19]

Bonneau et al.

[11] Patent Number: 5,280,002

[45] Date of Patent: Jan. 18, 1994

[54] THERMALLY STABLE CERIC OXIDE-BASED COMPOSITIONS AND PROCESS FOR THEIR PREPARATION

[75] Inventors: Lionel Bonneau, Angliers; Michèle Pijolat, La Talaudiere; Marie Prin, Moirans; Michel Soustelle, Saint Etienne; Olivier Touret, Aubervilliers, all of France

[73] Assignee: Rhone-Poulenc Chimie, Courbevoie, France

[21] Appl. No.: 890,152

[22] Filed: May 29, 1992

[30] Foreign Application Priority Data

Jun. 5, 1991 [FR] France ................... 91 06785

[51] Int. Cl.$^5$ .................. B01J 21/02; B01J 21/10; B01J 23/08; B01J 23/10
[52] U.S. Cl. ..................... 502/202; 502/304
[58] Field of Search .................. 502/202, 304

[56] References Cited

U.S. PATENT DOCUMENTS

| | | | |
|---|---|---|---|
| 2,525,073 | 10/1950 | Kimberlin et al. | 502/304 |
| 3,901,947 | 8/1975 | Enomoto et al. | 502/304 X |
| 4,714,694 | 12/1987 | Wan et al. | 502/304 |

FOREIGN PATENT DOCUMENTS

| | | |
|---|---|---|
| 0207857 | 1/1987 | European Pat. Off. . |
| 0272979 | 6/1988 | European Pat. Off. . |
| 0388567 | 9/1990 | European Pat. Off. . |
| 0396159 | 11/1990 | European Pat. Off. . |

OTHER PUBLICATIONS

Chemical Abstracts, vol. 110, No. 26 (Jun. 26, 1989), Abstract No. 233556r, pp. 43–50, K. Otsuka et al, "Cerium oxide based catalysts active for oxidative coupling of methane".

Primary Examiner—W. J. Shine
Attorney, Agent, or Firm—Burns, Doane, Swecker & Mathis

[57] ABSTRACT

Thermally stable ceric oxide-based compositions, well suited as catalysts/catalyst supports for a wide variety of reactions, notably for the catalytic conversion of exhaust gases emanating from internal combustion engines, comprise particulates of immixture of a major amount of ceric oxide with at least one other metal oxide of magnesium, gallium, boron, scandium, or mixture thereof, and having a specific surface greater than 10 m$^2$/g after calcination at 800° C.

21 Claims, No Drawings

THERMALLY STABLE CERIC OXIDE-BASED COMPOSITIONS AND PROCESS FOR THEIR PREPARATION

BACKGROUND OF THE INVENTION

1. Field of the Invention

The present invention relates to novel compositions based on ceric oxide having a thermally stable specific surface and to the use of such cerium oxide-based compositions, notably in the field of catalysis.

By "specific surface" is intended the B.E.T. specific surface as determined by the Brunauer, Emmett and Teller technique described in *Journal of the American Chemical Society*, 60, 309 (1938).

2. Description of the Prior Art

It is known to this art that ceric oxide is a useful catalyst or catalyst support. Compare, for example, the text by Paul Meriaudeau et al, relating to the synthesis of methanol from $CO+H_2$ in the presence of catalysts of platinum deposited onto ceric oxide. (*C. R. Acad. Sc. Paris*, v.297, Series II-471 (1983)).

It is also well known to this art that the efficiency of a catalyst is generally proportionately higher when the area of contact between the catalyst and the reactants is large. To accomplish this, the catalyst must be maintained in a state which is as finely divided as possible, namely, the solid particles comprising same must be as small and individualized as is possible. The fundamental role of the support, therefore, is to maintain the catalyst particles or crystallites in contact with the reactants in as finely divided state as can be attained.

Over the extended life of a catalyst support, its specific surface decreases, due, on the one hand, to the coalescence of the very fine micropores thereof and, on the other, to the enlargement of the divided particles, for example by sintering. During this decrease in surface area, a fraction of the catalyst is absorbed into the bulk of the support and is no longer available for contact with the reactants.

To date, most of the available ceric oxides have a specific surface which decreases rapidly in the event of operating temperatures higher than 500° C. Thus, R. Alvero et al, *J. Chem. Soc. Dalton Trans.*, 87 (1984), describe the preparation, from ceric ammonium nitrate, of a ceric oxide exhibiting a specific surface of 29 m²/g after calcination at a temperature of 600° C.

In the aforesaid P. Meriaudeau et al publication, a $CeO_2$ is prepared having a specific surface of 27 m²/g via essentially the same process.

SUMMARY OF THE INVENTION

Accordingly, a major object of the present invention is the provision of novel ceric oxide-based compositions exhibiting a thermally stable specific surface, comprising ceric oxide and at least one oxide of another metallic element A selected from among magnesium, scandium, boron, gallium or mixture thereof.

The ceric oxide-based compositions have a specific surface greater than 10 m²/g after calcination at 800° C. The specific surface can be measured after calcination at 800° C. for two hours. According to various features of the invention, the specific surface can be 25 m²/g after calcination at 700° C. for six hours, 19 m²/g after calcination at 850° C. for five hours, 11 m²/g after calcination at 850° C. for five hours, 20 m²/g after calcination at 1000° C. for at least two hours or 70 m²/g after calcination at 800° C. for two hours.

DETAILED DESCRIPTION OF THE PREFERRED EMBODIMENTS OF THE INVENTION

More particularly according to the present invention, the oxide of the other metallic element A may optionally be combined with ceric oxide, or may exist as a solid or other solution.

The ceric oxide is per se known to this art and is widely described in the literature, including the patent literature.

It can be prepared in particular, by heating in air, at a temperature ranging from 400° C. to 1,000° C., ceric hydroxide or certain oxygen-containing salts of cerium, such as the nitrates, sulfates, carbonates, oxalates or acetates (cf. Paul Pascal, *Nouveau Traité de Chimie Minérale* [New Treatise on Inorganic Chemistry], Volume VII, p. 777 (1959)) or ceric hydroxides in the form of a precipitate or colloidal suspension.

The ceric hydroxide employed has a specific surface of preferably at least 10 m²/g, more preferably higher than 80 m²/g and advantageously ranging from 80 to 300 m²/g.

Exemplary thereof is the ceric oxide described in published French Patent Application No. 2,559,754, which has a specific surface of up to 180 to 300 m²/g, measured after calcination at a temperature ranging from 400° to 450° C.; such oxide is prepared as described below, by calcining an aqueous colloidal dispersion of a compound of cerium(IV) which has been first destabilized by addition of a base thereto.

For certain applications, it may be advantageous to process the ceric oxide by agglomeration of the particles thereof by well-known techniques for extrusion or pelleting under pressure.

In addition to ceric oxide, the compositions of the invention advantageously comprise an oxide of the abovementioned metal(s) A in an amount of from 1 to 20 atomic % of metal A atoms relative to the cerium atoms, preferably from 1% to 10%, and more preferably from 1% to 5%. It is preferably prepared via a process comprising mixing the ceric oxide with the at least one oxide of the other metals A.

The process for preparing the ceric oxide-based composition can comprise (a) calcining a thermally decomposable cerium compound at a temperature below 500° C. to produce a cerium oxide therefrom, (b) impregnating the cerium oxide thus produced with a solution of a thermally decomposable compound of the at least one other metal, (c) optionally drying and then (d) calcining such impregnated cerium oxide. The thermally decomposable cerium compound can comprise a cerium salt, a hydrated cerium compound, or a cerium hydrate.

Such admixing may be carried out by impregnating ceric oxide with a solution of at least one salt of the aforesaid metals A which can be decomposed thermally into the oxide, hereinafter designated an "oxide precursor."

Exemplary oxide precursors of the metals A include, for example, nitrates, sulfates, acetates and oxide hydrates.

In a preferred embodiment of the invention, the impregnation is carried out "dry", i.e., such that the total volume of solution employed is approximately equal to the total pore volume exhibited by the ceric oxide. In order to determine the pore volume, the known technique using a mercury porosimeter may be employed, or else by measuring the amount of water absorbed by a sample.

It is also possible to impregnate the support by immersing it in the solution of the oxide precursor of the element A and to remove the excess solution by draining.

The concentration of the oxide precursor solutions depends on the solubility thereof.

In a second stage of the process of the invention, the impregnated ceric oxide is dried to remove the water, thus providing the desired oxide precursors in dispersed form in ceric oxide.

The drying is typically carried out in air at a temperature which advantageously ranges from 80° C. to 300° C. and preferably from 100° C. to 150° C. The drying is continued until a constant weight is obtained.

The drying time generally ranges from 1 to 24 hours.

In a third stage of the process of the invention, the impregnated ceric oxide is calcined at a temperature which advantageously ranges from 400° C. to 1,200° C. and preferably from 600° to 1,000° C. The calcining time must be sufficient to convert the precursors into oxides and is a function of the temperature of intended application of the ceric oxide.

The calcining time may vary over wide limits of from 1 to 24 hours and preferably from 4 to 10 hours.

The compositions of the invention may be prepared by other processes entailing mixing a ceric oxide precursor with a precursor of the other metallic element A, it being possible for this mixture to be prepared at any stage in the production of the ceric oxide or precursor thereof.

Thus, the event of producing the mixture of the metallic element or its precursor with the ceric oxide or precursor thereof depends on the nature of the element A or precursor thereof and on the conditions of preparation of the ceric oxide.

For example, one preparative technique according to the invention entails introducing the metallic element in the form of a precursor thereof into an aqueous colloidal dispersion of a cerium(IV) compound.

The process can comprise (i) hydrolyzing a cerium (IV) compound to provide a colloidal dispersion of hydrolysis, (ii) destabilizing the colloidal dispersion by adding a base thereto, (iii) separating the precipitate thus formed, (iv) thermally treating the precipitate and (v) calcining the thermally treated precipitate. The process can further comprise incorporating the thermally decomposable compound of the at least one other metal during steps (i), (ii) or (iv). The process can further include incorporating the thermally decomposable compound of the at least one other metal upstream of the thermal treatment (iv). The thermally decomposable compound of the at least one other metal can comprise a salt, a hydroxide or an oxide hydrate.

This embodiment comprises preparing the compositions of the invention by a process including:

(a) in a first stage, introducing at least one oxide precursor of a metallic element A into an aqueous colloidal dispersion of a cerium(IV) compound;

(b) in a second stage, destabilizing such dispersion by adding a base thereto;

(c) in a third stage, separating off the precipitate thus obtained; and (d) in a fourth stage, subjecting the separated precipitate to a heat treatment.

In the first stage of the process of the invention, any aqueous colloidal dispersion of a cerium(IV) compound may be employed, particularly those described in published French Patent Application No. 2,596,381, permitting production of ceric oxides having high specific surfaces.

The aqueous colloidal dispersions of a cerium(IV) compound described in French Patent Application 2,596,381 are obtained by dispersing, in water, a cerium-(IV) compound having the general formula (I):

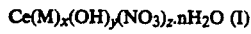

$$Ce(M)_x(OH)_y(NO_3)_z \cdot nH_2O \quad (I)$$

in which M is an alkali metal or a quaternary ammonium group; x is a number ranging from 0 to 0.2; z is a number ranging from 0 to 0.7; y is such that $y=4-z+x$; and n is a number ranging from 0 to approximately 20.

The concentration of the cerium(IV) compound in the sol is not critical. When expressed as $CeO_2$, it advantageously ranges from 0.1 to 2.0 moles/liter and preferably from 0.5 to 1 mole/liter.

The proportion of cerium(IV) in colloidal form is greater than 95%, but the invention also comprehends a sol in which cerium(IV) might be present in ionic form. A cerium ratio of from 99% to 100% is preferably selected.

The size of the colloids present in the sol may vary over a wide range. The mean hydrodynamic diameter of the colloids, determined by quasi-elastic light scattering according to the technique described by Michael L. McConnell, *Analytical Chemistry*, 53, No. 8, 1007 A (1981), generally ranges from 30 to 2,000 Å.

The cerium(IV) compound is advantageously prepared by a process which comprises, in a first stage, hydrolyzing an aqueous solution of a cerium(IV) salt in an acidic medium, in a second stage separating off the precipitate thus obtained and, in a third stage, which is not strictly required, heat-treating such precipitate.

Exemplary aqueous solutions of a cerium(IV) salt include a ceric nitrate solution obtained by the action of nitric acid on a ceric oxide hydrate prepared conventionally, for example by reacting a solution of a cerous salt, cerous carbonate, and a solution of aqueous ammonia in the presence of aqueous hydrogen peroxide.

The ceric nitrate solution obtained by the electrolytic oxidation of a cerous nitrate solution, described in published French Patent Application FR-A-2,570,087, is a preferred raw material.

The water-dispersible cerium(IV) compound can also be obtained by disintegration of a ceric oxide in an acidic medium, especially nitric acid, as described in U.S. Pat. Nos. 3,645,910, 3,761,571, 4,231,893, 4,356,106, 4,576,921 and 4,606,847.

In this embodiment, the metallic oxide precursors are employed in the form of aqueous solutions or in solid form.

The second stage of the process of the invention comprises the destabilization of the aqueous colloidal dispersion of cerium(IV) compound containing at least one oxide precursor of the element A, by addition of a base to such dispersion.

Such basic solution is advantageously an aqueous solution of aqueous ammonia, of sodium hydroxide, or of potassium hydroxide It is also possible to use gaseous ammonia. According to the invention, a solution of aqueous ammonia is preferably used.

The normality of the basic solution is not critical according to the invention; it may vary over wide limits, for example from 0.1 to 11N, but it is preferred to use solutions whose concentrations range from 5 to 10N.

The amount of base which is added is determined such that the final pH of the treated dispersion is higher than 7 and preferably higher than or equal to 9 and lower than or equal to 10.

The third stage of the process comprises separating off the precipitate obtained according to traditional solid/liquid separation techniques, e.g., filtration, sedimentation, centrifuging or draining.

This separation is typically carried out at room temperature.

The separated precipitate may optionally be subjected to a washing operation.

The washing may be carried out with water or with an organic solvent. Exemplary such organic solvents include the aliphatic, cycloaliphatic or aromatic hydrocarbons, aliphatic or cycloaliphatic ketones or aliphatic or cycloaliphatic alcohols, such as methanol, ethanol, n-propanol, isopropanol, n-butanol, isobutanol and neobutanol.

In the fourth stage of the process of the invention, the product obtained is thermally treated after separation and optional washing.

The thermal treatment is generally initiated by a drying operation carried out in air or at a reduced pressure on the order of 1 to 100 mm of mercury (1,33.3322 pa to 13,332.2 Pa). The drying temperature may range from room temperature to 100° C. and the drying time is not critical and may range from 2 to 48 hours and preferably from 10 to 24 hours.

Then, in a final operation, the dried product is calcined at a temperature ranging from 400° C. to 1,200° C., but preferably from 600° C. to 1,000° C. It is conducted for approximately 1 hour to 24 hours and preferably from 4 to 10 hours.

The calcination temperature is determined as a function of the desired specific surface for the ultimate catalytic application, taking into account that the specific surface is proportionately smaller the higher the calcination temperature.

In alternative embodiments of the process of the invention, the metallic oxide precursor may be added during the production of the dispersible cerium(IV) compound, namely, during the stage of hydrolysis of a cerium(IV) compound.

It may also be added and mixed with the recovered compound after destabilization of the sol, especially when this compound is hydrothermally treated, as described in French Patents Nos. 2,617,154, 2,632,945 and 2,640,954 and European Patent No. 300,852.

The ceric oxide-based compositions according to the invention may be used for a wide variety of ultimate applications. For example, they may be used as a filler material, binder, washcoat, thickener, dispersant, reinforcing agent, pigment and absorbent.

The stabilized ceric oxide according to the invention is well suited for use in the field of catalysis, whether as catalyst or as catalyst support.

It may be used as catalyst or catalyst support for carrying out a variety of reactions such as, for example, dehydration, hydrosulfurization, hydrodinitrification, desulfurization, hydrodesulfurization, dehydrohalogenation, reforming, steam reforming, cracking, hydrocracking, hydrogenation, dehydrogenation, isomerization, disproportionation, oxidative chlorination, dehydrocyclization of hydrocarbons or other organic compounds, oxidation and/or reduction reactions, the Claus reaction, the catalytic conversion of exhaust gases emanating from internal combustion engines, demetallation, methanation and shift conversion.

One of the most important final applications is, of course, the use of the subject compositions as a component of a catalyst for the catalytic conversion of exhaust gases emanating from internal combustion engines. Thus, for this application, the stabilized ceric oxide is admixed with alumina before or after impregnation with catalytically active elements such as precious metals.

This mixture is either shaped to form catalysts, for example in bead form, or is used as a coating for a refractory body such as a monolith of a ceramic or a metal; such coating is generally designated a "washcoat".

In order to further illustrate the present invention and the advantages thereof, the following specific examples are given, it being understood that same are intended only as illustrative and in nowise limitative.

In said examples to follow, the metallic elements were determined by plasma emission spectrometry.

EXAMPLE 1

Stabilization With Boron

A cerium oxide produced by thermal decomposition of a cerium carbonate, exhibiting a specific surface of 115 $m^2/g$ and a pore volume of 0.21 $cm^3/g$ (measured by impregnation with water), after being calcined at 400° C. for 6 hours, was impregnated with an aqueous solution of orthoboric acid containing 46 g/l of the acid.

This impregnation was carried out via the "dry impregnation" technique, namely, the volume of the impregnating solution was approximately equal to the pore volume of the solids to be impregnated.

The impregnated product was dried in an oven under air for 10 hours at 120° C. and then calcined at 700° C. for 6 hours.

A control test was also carried out under the same conditions, but with the solution of orthoboric acid being replaced with pure water.

The results obtained are reported in Table I below:

TABLE I

| Example | Composition (atom %) | Specific surface after calcination at 700° C. | $CeO_2$ crystallite size |
|---|---|---|---|
| Control | $CeO_2$ | 16 $m^2/g$ | 27 nm |
| Example 1 | $CeO_2 + B_2O_3$ B/Ce = 2.5% | 25 $m^2/g$ | 20.3 nm |

The crystallite size was measured by the width of a line at mid-height of the 111 line of the x-ray diffraction spectrum of cerium oxide $CeO_2$, employing the Debye-Scherrer equation.

The specific surface was measured by the aforesaid B.E.T. method described in S. Brunauer, P. H. Emmett and E. Teller, *J.A.C.S.*, 60, pp. 309–319 (February 1938).

EXAMPLE 2

Stabilization With Scandium

The impregnation of a cerium oxide identical with that of Example 1 was carried out using an aqueous solution of scandium nitrate containing 979 g/l of Sc(NO₃)₃.4H₂O, employing the impregnation technique described in Example 1.

The product was then dried in air at 120° C. for 10 hours and then calcined at 850° C. for 5 hours.

A control test was carried out under the same conditions, but using pure water as the impregnating solution.

The results obtained are reported in Table II below:

TABLE II

| Example | Composition (atom %) | Specific surface after calcination at 850° C. | $CeO_2$ crystallite size |
|---|---|---|---|
| Control | $CeO_2$ | 5 m²/g | 55.6 nm |
| Example 2 | $CeO_2 + Sc_2O_3$ Sc/Ce = 10% | 19 m²/g | 16.3 nm |

EXAMPLE 3

Stabilization With Magnesium

The procedure of Examples 1 and 2 was repeated, but using a solution of magnesium nitrate containing 828 g/l of $Mg(BNO_3)_2.6H_2O$.

The impregnated cerium oxide was dried in the oven at 120° C. for 10 hours and then calcined for 5 hours at 850° C.

A control test was carried out under the same conditions, but again using pure water.

The results obtained are reported in Table III below:

TABLE III

| Example | Composition (atom %) | Specific surface after calcination at 850° C. | $CeO_2$ crystallite size |
|---|---|---|---|
| Example 3 | $CeO_2 - MgO_2$ Mg/Ce = 10% | 11 m²/g | 29.3 nm |
| Control | $CeO_2$ | 5 m²/g | 55.6 nm |

EXAMPLE 4

Stabilization With Gallium

A cerium oxide prepared by the process described in published French Patent Application No. 2,617,154, exhibiting a specific surface of 240 m²/g and a pore volume of 0.50 cm³/g after calcination at 400° C. for 6 hours, was impregnated with an aqueous solution of gallium nitrate (120 g/l of $Ga(NO_3)_3.8H_2O$) employing the technique described in Example 1.

The product was then dried in the oven in air at 120° C. and then calcined for 6 hours at 1,000° C. in air.

A control test was carried out using the same process, but using pure water as the impregnating solution.

The results obtained are reported in Table IV below:

TABLE IV

| Example | Composition (atom %) | Specific surface after calcination at 1,000° C. | $CeO_2$ crystallite size |
|---|---|---|---|
| Control | $CeO_2$ | 16 m²/g | >50 nm |
| Example 4 | $CeO_2$ $Ga_2O_3$ Ga/Ce = 2.5% | 20 m²/g | 34.9 nm |

EXAMPLE 5

Stabilization With Boron

A cerium oxide was prepared by the process described in published French Patent Application No. 2,640,954.

This process entailed hydrolyzing a cerium(IV) salt (cerium nitrate solution produced by electrochemical oxidation of a cerous nitrate solution), and then destabilizing the resulting suspension by adding aqueous ammonia thereto. The solids thus obtained were filtered off and then placed in an autoclave in aqueous medium.

This aqueous medium contained a specified amount of boric acid to provide a B/Ce atomic ratio equal to 2.5%.

The mixture was maintained at 200° C. at $16 \times 10^5$ Pa for one hour.

The recovered product was dried in an oven for 10 hours at a temperature of 120° C. and then calcined for 2 hours at 800° C.

A control test was carried out without addition of boric acid to the autoclave medium.

The results obtained are reported in Table V below:

TABLE V

| Example | Composition (atom %) | Specific surface after calcination at 800° C. | $CeO_2$ crystallite size |
|---|---|---|---|
| Control | $CeO_2$ | 60 m²/g | 5.6 nm |
| Example 5 | $CeO_2.B_2O_3$ B/Ce = 1.5% | 70 m²/g | 5.1 nm |

EXAMPLE 6

Stabilization With Gallium

The procedure of Example 5 was repeated, with the boric acid being replaced by gallium nitrate, and using a calcination temperature of 1,000° C.

The results obtained are reported in Table VI below:

TABLE VI

| Example | Composition (atom %) | Specific surface after calcination at 800° C. | $CeO_2$ crystallite size |
|---|---|---|---|
| Control | $CeO_2$ | 19 m²/g | 50 nm |
| Example 6 | $CeO_2$ $Ga_2O_3$ Ga/Ce = 2.5% | 22 m²/g | 34.6 nm |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermally stable ceric oxide-based composition of matter, comprising particulates of immixture of a major amount of ceric oxide with at least one other metal oxide of magnesium, gallium, boron, scandium, or mixture thereof, and having a specific surface greater than 10 m²/g after calcination at 800° C.

2. The ceric oxide-based composition as defined by claim 1, wherein the atomic ratio of such other metal relative to the cerium ranges from 1% to 20%.

3. The ceric oxide-based composition as defined by claim 2, wherein the other metal/cerium atomic ratio ranges from 1% to 10%.

4. The ceric oxide-based composition as defined by claim 3, wherein the other metal/cerium atomic ratio ranges from 1% to 5%.

5. The ceric oxide-based composition as defined by claim 1, said other metal comprising magnesium.

6. The ceric oxide-based composition as defined by claim 1, said other metal comprising gallium.

7. The ceric oxide-based composition as defined by claim 1, said other metal comprising boron.

8. The ceric oxide-based composition as defined by claim 1, said other metal comprising scandium.

9. A process for the preparation of the ceric oxide-based composition as defined by claim 1, comprising (a) calcining a thermally decomposable cerium compound at a temperature below 500° C. to produce a cerium oxide therefrom, (b) impregnating the cerium oxide thus produced with a solution of a thermally decomposable compound of said at least one other metal, (c) optionally drying and then (d) calcining such impregnated cerium oxide.

10. The process as defined by claim 9, said thermally decomposable cerium compound comprising a cerium salt, a hydrated cerium compound, or a cerium hydrate.

11. The process as defined by claim 9, comprising (i) hydrolyzing a cerium(IV) compound to provide a colloidal dispersion of hydrolysis, (ii) destabilizing such colloidal dispersion by adding a base thereto, (iii) separating the precipitate thus formed, (iv) thermally treating said precipitate and (v) calcining said thermally treated precipitate, and further comprising incorporating said thermally decomposable compound of said at least one other metal during the above steps (i), (ii) or (iv).

12. The process as defined by claim 11, comprising incorporating said thermally decomposable compound of said at least one other metal upstream of said thermal treatment (iv).

13. The process as defined by claim 9, said thermally decomposable compound of said at least one other metal comprising a salt, a hydroxide, or an oxide hydrate.

14. The thermally stable ceric oxide-based composition produced by the process as defined by claim 9.

15. A catalyst comprising a porous support substrate having a catalytically active phase deposited thereon, said porous support substrate comprising the thermally stable ceric oxide-based composition as defined by claim 1.

16. The catalyst as defined by claim 15, said porous support substrate comprising admixture of alumina and said thermally stable ceric oxide-based composition.

17. The catalyst as defined by claim 15, said support substrate comprising a monolithic refractory shaped article coated with said thermally stable ceric oxide-based composition.

18. The ceric oxide-based composition as defined by claim 1, wherein the specific surface is measured after calcination at 800° C. for two hours.

19. The ceric oxide-based composition as defined by claim 1, wherein the specific surface is 11 $m^2/g$ after calcination at 850° C. for five hours.

20. The ceric oxide-based composition as defined by claim 1, wherein the specific surface is 25 $m^2/g$ after calcination at 700° C. for six hours.

21. The ceric oxide-based composition as defined by claim 1, wherein the specific surface is at least 20 $m^2/g$ after calcination at 1000° C. for two hours.

* * * * *